United States Patent [19]

Ito et al.

[11] 4,425,591

[45] Jan. 10, 1984

[54] MAGNETIC RECORDING/REPRODUCING APPARATUS

[75] Inventors: Yukio Ito; Kazuki Takai; Satoshi Takagi, all of Toda, Japan

[73] Assignee: Clarion Co., Ltd., Tokyo, Japan

[21] Appl. No.: 281,277

[22] Filed: Jul. 8, 1981

[30] Foreign Application Priority Data

Jul. 8, 1980 [JP] Japan .................................. 55-92313

[51] Int. Cl.³ ....................... G11B 15/00; G11B 21/02
[52] U.S. Cl. ..................................... 360/88; 360/105; 360/96.3; 360/137
[58] Field of Search ..................... 360/71, 88, 90, 104, 360/105, 106, 107, 96.1, 96.2, 96.3, 96.4, 137

[56] References Cited

U.S. PATENT DOCUMENTS

4,167,764  9/1979  Hanajima et al. ..................... 360/90
4,373,172  2/1983  Motoyama .......................... 360/105

Primary Examiner—Robert L. Richardson
Attorney, Agent, or Firm—Flynn, Thiel, Boutell & Tanis

[57] ABSTRACT

A magnetic recording/reproducing apparatus in a tape player comprising a rotatable cam and an operational means interlocking with the rotatable cam. The operational means is arranged to operate a control means for forwardly and rearwardly moving reproduction mechanisms like a head, a pinch roller or an idler and the control means is to be held in its reproduction position by a locking means.

5 Claims, 15 Drawing Figures

FIG.8

MAGNETIC RECORDING/REPRODUCING APPARATUS

BACKGROUND OF THE INVENTION

1. Field of the Invention

The present invention relates to a magnetic recording/reproducing apparatus in a tape player, and more specifically, to a novel mechanism capable of not only generally reducing force required for operations including eject of a cassette, fast feeding and rewinding of a tape in a tape player, but also being formed smaller and thinner in size.

2. Description of the Prior Art

It is generally required to push forward and draw back a head plate with respect to a tape pack in order to put the tape player in reproducing playing mode or release it from the mode.

Conventionally, there have been proposed various mechanisms of the above type. However, such conventional mechanisms have generally been arranged so that the operations for forward and rearward displacement of the head plate have to be manually done, thus having such a disadvantage that their operation is somewhat troublesome.

Further, operations such as eject of a cassette, fast feeding and rewinding of a tape are substantially requisite in those tape players. Particularly in the conventional mechanisms, it is necessary to operate the head plate so as to release it from the play mode every time before doing other operations. Therefore, manual force has repeatedly been required for carrying out such operations. Additionally, it should be noted that such operational force has to be large enough to compress a spring provided for returning each operational member. Then, the conventional mechanisms have been inconvenient because a fairly large manual force has had to be applied repeatedly for respective operations. The head plate and its operational member are usually disposed in a rear portion of the tape player, and on the other hand, the ejecting means, the fast feeding means and the rewinding means are disposed in a front portion of the tape player, so as to keep a positional balance between those operational means as well as in the whole body of the tape player and to allow the tape player to be formed compact in size. With this arrangement, to operate the head plate by means of the ejecting means, the fast feeding means or the rewinding means which are disposed in the opposed position to that of the head plate, linkage means should be provided all over the tape player thus to be extremely complicated and large in size. Therefore, the object of making the tape player smaller and thinner could not be attained.

In this connection, it was proposed to carry out operation of the head plate and other operations by means of an operational means such as an electromagnetic plunger without requiring manual force. However, since the force required for the above operations is so large as explained above the plunger also has to have a large capacity. Therefore, there occur problems not only that the plunger comes out large but also that an electric circuit, etc. for controlling the plunger has to be arranged to bear such a large capacity.

OBJECTS OF THE INVENTION

It is therefore an object of the present invention to operate a control means for causing forward and rearward displacement of mechanisms relative to the reproduction such as a head plate, a pinch roller, an idler and the like by means of a rotatable cam and an operational means interlocking with the rotatable cam.

Another object of the invention is to arrange the above operational means to cause the channel switching operation of the switching cam, thus carrying out the operation for moving reproducing devices as well as the channel switching operation by means of one mechanism.

SUMMARY OF THE INVENTION

In accordance with the present invention, there is provided a magnetic recording/reproducing apparatus which comprises:
a motor;
a first locking means;
a cam means;
a rotation transmitting means normally fixed to said first locking means for transmitting power of said motor to said cam means with operation of said first locking means, thus to rotate same;
a magnetic recording/reproducing means;
a control means for shifting said magnetic recording/reproducing means to recording or reproducing position in response to the rotation of said cam means; and
a second locking means for locking said control means at the recording or reproducing position.

DETAILED DESCRIPTION OF THE PREFERRED EMBODIMENTS

The present invention will now be described in detail referring to the preferred embodiments illustrated in the accompanying drawings.

Figure 1:
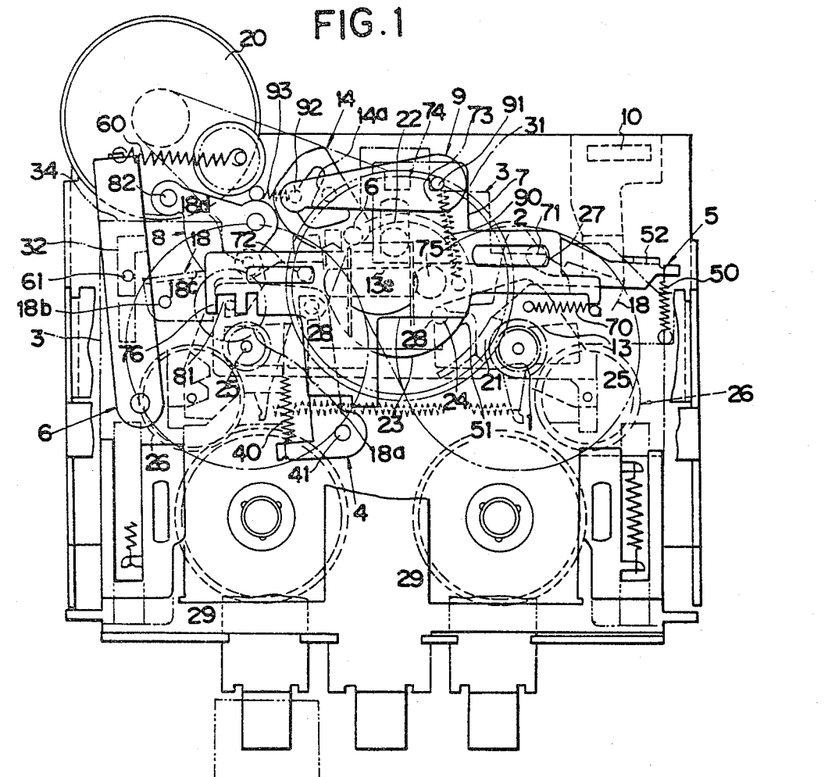
FIG. 1 shows a ground plan illustrating main structural relations in a tape player according to the invention being at rest.
Figure 2:
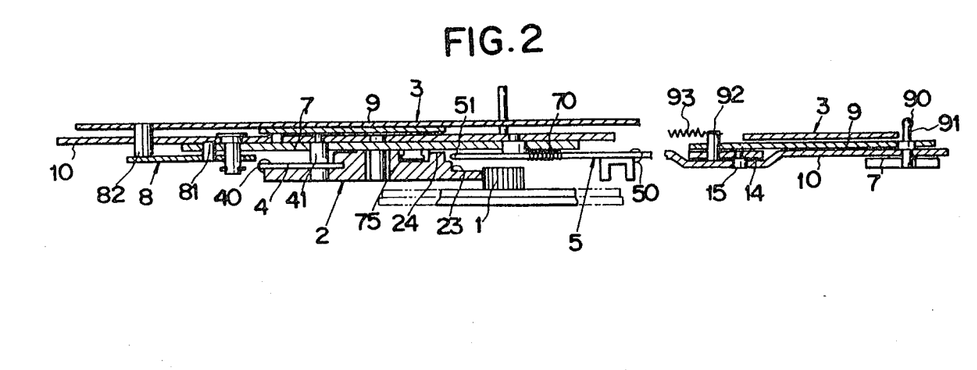
FIG. 2 shows a sectional view illustrating structural relations between members of the tape player in FIG. 1.

A gear 1 is driven by a motor 20 mounted on a deck 10 for driving a tape. The gear 1 is integrally formed with a flywheel and a capstan and is rotatably mounted on a lower surface of the deck 10. A rotatable gear 2 in a respectively large size is mounted in a portion so as to engage with the gear 1. The rotatable gear 2 is formed with a recessed portion 21 for releasing it from engagement with the driving gear 1. The rotatable gear 2 is also formed with a winding cam portion 22 and a disk portion 23 at a surface thereof in a stepped manner. A notch 23a is formed in the periphery of the disk portion 23. A preparatory plate 4 is pivotally supported on the deck 10 at its base end and the free end portion thereof is disposed in face of the notch 23a. Between the preparatory plate 4 and the deck 10 there is provided a spring 40. The spring 40 is arranged to apply a rotational force to the rotatable gear 2 to bring it in engagement with the driving gear 1 in such condition as shown in FIG. 1. Further, a locking plate 5 is pivotally mounted on the deck 10 by means of a pin 71 at a central portion thereof. An engaging end 51 of the locking plate 5 is positioned in face of a protuberance formed on the periphery of the disk portion 23 while a plunger (not shown) provided at an operational end of the locking plate 5 is not actuated, thus to be locked by the rotational force of the guide plate 4. The pin 71 not only pivotally supports the locking plate 5 but also guides an operational plate 7 to slide together with another pin 72. That is, a spring 70 is provided between the operational plate 7 and the deck 10 thus to force the operational plate 7 to slide to left in FIGS. 1-9. However, the operational plate 7 is formed with an engaging element 75 at a central portion thereof for always being in contact with the cam portion 22 by the spring force of the spring 70, thus causing the operational plate 7 to horizontally reciprocate in the drawings in response to rotation of the cam portion 22.

Figure 3:
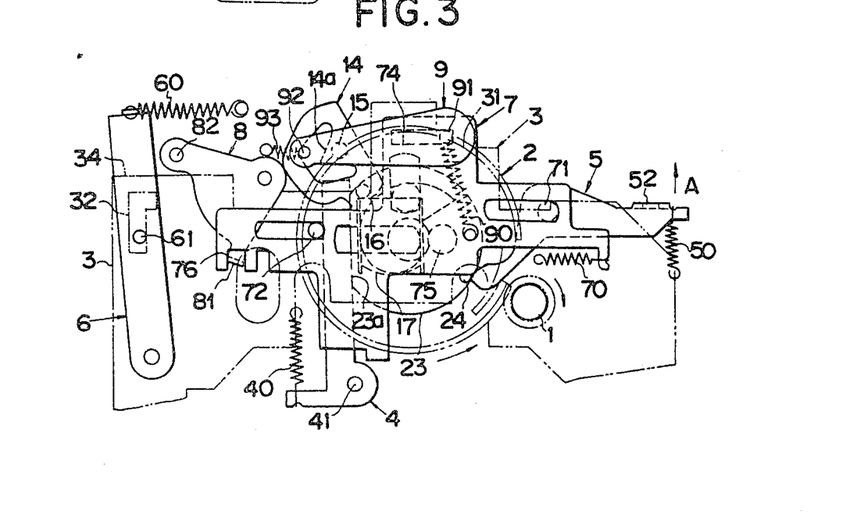
FIG. 3 shows a partial ground plan illustrating a condition that the driving gear and the rotatable gear get engaged with each other due to the operation of the locking plate.
Figure 4:
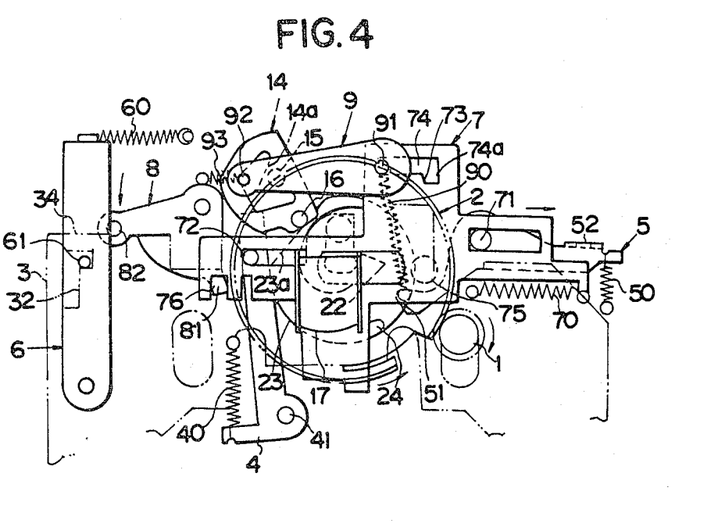
FIG. 4 shows a partial ground plan illustrating a condition that the rotatable gear is consequently rotated to cause the operational plate to slide and the control plate to advance.

The operational plate 7 is also formed with a bore 74 including a hook portion 73 formed in a manner turning an end of the bore 74 in J-like configuration. Then, a pin 91 of a cam operational plate 9 is selectively received in the hook portion 73 in response to operation of a control plate 3. That is, a spring 90 is provided for pulling the pin 31 out of the hook portion 73 and an engaging step 31 is formed on an upper portion of the control plate 3 in the drawings, so that when the control plate 3 is in such a condition as shown in FIGS. 1 and 3, the pin 91 does not get in engagement with the hook portion 73 resiliently to the spring force and the cam operational plate 9 is accordingly prevented from being actuated even on movement of the operational plate 7. Further, the control plate 3 is formed with a locking bore 32 at a left end portion thereof in the drawings. The operational plate 7 is also formed with an engaging portion 76 at the left end thereof in the drawings for engaging with an engaging end 81 of a sectional operational member 8. The operational member 8 is pivotally supported on the deck 10 at its base end and an operational end 82 of the operational member 8 is positioned in face of a control plate locking member 6 independently pivotally supported on the deck 10 at its base end. The control plate locking member 6 is provided with a spring 60 and a pin 61 which is inserted in the locking bore 32, so that the engaging end 82 acts on the control plate 3 to push it as shown in FIG. 4 due to the pivotal movement of the operational member 8 during reciprocation of the operational plate 7 as shown in FIG. 4 caused by the cam portion 22. Therefore, the pin 61 is made to fall in a hook portion of the locking bore 32 to thereby lock the control plate 3 in the condition possible to be pushed.

Incidentally, as apparent from comparison between FIGS. 1, 3 and FIG. 4, there remains a gap between the operational end 82 of the operational member 8 and an upper end portion 34 of the control plate 3 for receiving the force of the operational end 82 as shown in FIGS. 1, 3. Therefore, even if the operational end 82 of the operational member 8 is rotated during reciprocal movement of the operational plate 7, the control plate 3 is kept immoved until the operational end 82 comes to contact with the upper end portion 34. That is, the control plate 3 receives the pushing force a little later during the reciprocation of the operational plate 7. Then, even if the control plate 3 is made to advance (downwardly slide) due to the above-described relation between the bore 74 and the pin 91 as shown in FIG. 1 and 3, the operational plate 7 is prevented from antecedently sliding over a distance larger than the length of the bore 74 of the operational plate, thus keeping the pin 91 out of the hook portion 73 of the bore 74. Incidentally, the control plate 3 is given a backward spring force by a spring (not shown) provided between the control plate 3 and the deck 10.

The cam operational plate 9 is provided with a pin 92 at a top end thereof. Between the top end of the pin 92 and the deck 10 is provided a spring 23. The lowermost end of the pin 92 is inserted in a cam hole of a switching cam 14 having a tooth 14a. Thus, the switching cam 14 is switched by operating the cam operational plate 9 as shown in FIGS. 5-9. In this embodiment, when reversely switched, the switching cam 14 is arranged to switch channels, i.e. feeding direction of the tape.

The concrete structure for channel changing is as follows. The switching cam 14 is pivotally supported on the deck 10 by a pivot 15. In an end portion of the switching cam 14 is provided a pin 16 which is in engagement with a channel switching plate 13 slidably mounted on the deck 10. The structure and function of the channel switching plate 13 is as conventionally known. That is, in the above referred embodiment, the control plate 3 is provided with a head 17 as well as a pair of supporting axes 18b each for supporting a pinch roller casing 18 having a pinch roller 18a. Each pinch roller casing 18 is further provided a roller 18c which is disposed in face of a cam portion 13e of the channel switching plate 13 under the control plate 3. Between the central point 18d of the roller 18c and the control plate 3 is provided a spring for constantly applying force to press the pinch roller 18a to the corresponding capstan 25.

When the channel switching plate 13 is made to slide due to the reverse switching operation of the switching cam 14 as mentioned above, one of the cam portions 13e is disengaged from the roller 18c to thereby press one of the pinch rollers 18a against the capstan 25, thus creating tape feeding mode. In this case, the other pinch roller 18a is pushed resistantly to the spring force by the roller 18c of the corresponding roller casing 18 and the channel switching plate 13, thus released from its tape feeding condition.

When the channel switching plate 13 is displaced to the opposite direction by means of the switching cam 14, the other cam portion 13a disengages from the roller 18c of the corresponding roller casing, thus, creating tape feeding condition by means of the spring force. In this case, the roller 18c of the former roller casing 18 which has been in a tape feeding condition till now is pushed against the spring force by the cam portion 13a of the corresponding channel switching plate 13, thus released from its tape feeding condition. Therefore, the contrary condition to that formerly described is obtained, that is, the tape feeding direction is reversed, thus carrying out the channel switching operation, as conventionally known.

In this embodiment, the channel switching plate 13 is arranged to also switch an idler 26. That is, each idler 26 is mounted on an idler plate 27 and a pin 28 of the idler plate 27 is disposed in face of the other cam portion 13e of the channel switching plate 13. Therefore, when one of the flywheels and the corresponding reel base 29 is linked together, the linkage between the other flywheel and the corresponding reel base 29 is cancelled, and thus such relation is alternatively changed in such a manner as above described.

In the aforementioned embodiment, the driving gear 1 rotated by a motor directly engages with the rotatable gear 2 having the cam portion 22. Then, the rotatable gear 2 is formed with a cut portion 21 for being timely disengaged from the driving gear 1. However, the invention is not restricted to such structure. For example, a transmitting gear may be interposed between the driving gear 1 and the rotatable gear 2 for putting those gears in and out of linkage. Further, frictional interlocking means such as a belt, an idler, etc. may be used instead of gears. In this case, linking-in and linking-off operation can be carried out by loosening or tensing such belt, for example.

The driving gear 1 is integrally and concentrically formed with the flywheel and the capstan in the above embodiment. However, an independent gear may be provided on a desired portion of the deck 10.

In connection with tape end detection for the purpose of channel switching, the following means may be adopted independently or in combination: mechanical means making use of friction on the reel base and electrical means such as a switch, an IC having a Hall circuit, a reed switch, a photocoupler, and the like.

An independent motor may be provided for driving the driving gear 1. However, the motor 20 for feeding tape is commonly used in the above embodiment. Therefore, although not shown in the drawings, each capstan (flywheel) adjacent to the pinch roller is joined with the motor pulley by means of a belt as conventionally known.

Figure 10:
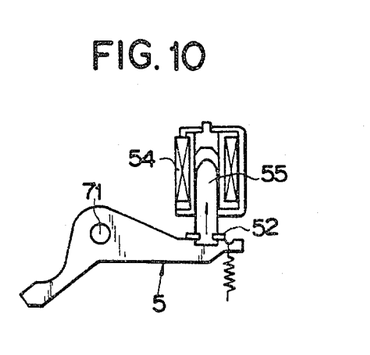
FIG. 10 is an explanation drawing illustrating the operational mechanism by the plunger with respect to the locking plate.
Figure 11:
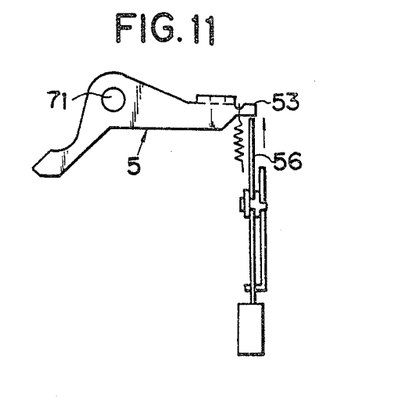
FIG. 11 is an explanation drawing illustrating the operational mechanism by the manual switching lever.

In FIG. 10, an electromagnetic plunger 55 engages with the operational portion 52 of the locking plate 5. An electromagnetic mechanism 54 of the plunger 55 is energized by means of a detecting switch provided in a tape pack setting portion for detecting whether a tape has been set, a tape end detecting signal, a program switching operation or the like. However, operation of the locking plate 5 is not restricted to such manner utilizing the electromagnetic plunger 55 but may be carried out by a mechanical operational lever 56 as shown in FIG. 11. That is, by operating the operational lever 56 pressed to the top end portion of the locking plate 5, the locking plate 5 is made to pivot on the pin 71.

Figure 12:
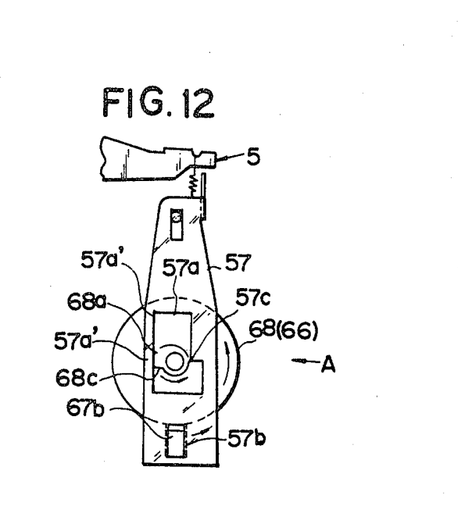
FIG. 12 is an flat explanation drawing illustrating the operational mechanism utilizing the eccentric cam and the sensing lever for the automatic reversing operation.
Figure 13:
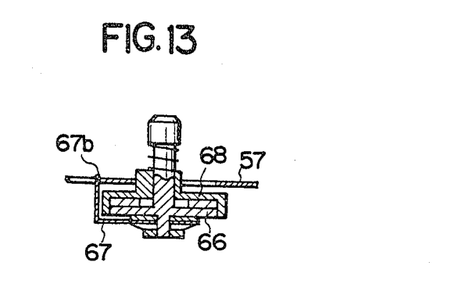
FIG. 13 shows a sectional view of a part of the reel base and the pulley.

Channel switching operation may be carried out by utilizing a tape stop detecting means having an eccentric cam or a tape tension detecting means as shown in FIGS. 12, 13. In FIG. 13, a sensing lever 57 is provided with respect to the reel base 66. The sensing lever 57 is formed with a bore 57a for receiving an eccentric cam portion 68a of the pulley 68 which is concentrically connected to the reel base 66. The sensing lever 57 is further formed with another bore 57b in which an engaging portion 67b of the interlocking plate 67 pressed to the reel base 66 is inserted. With this arrangement, while the reel base 66 continues to rotate integrally with the reel to the direction as shown in FIG. 12 by an arrow, the sensing lever 57 is pushed by the engaging portion 67b to rotate anticlockwise in FIG. 12. At the same time, the sensing lever 57 is also given a force opposed to the above rotational direction between the eccentric cam portion 68a and an end 57a' of the bore 57a. Thus, when the reel base 66 (and accordingly the reel) is stopped on some occasions (end of a tape, entanglement of a tape, for example), the sensing lever 57 does not receive any force from the engaging portion 67b to thereby remains in a position clockwise rotated by the eccentric cam portion 68a without returning as shown in FIG. 11. In that condition, when the eccentric cam portion 68a is further rotated, a step portion 68c thereof acts on a step portion 57c of the bore 57a to thereby cause the sensing lever 57 to operate the locking plate 5 with the top end thereof.

Figure 14:
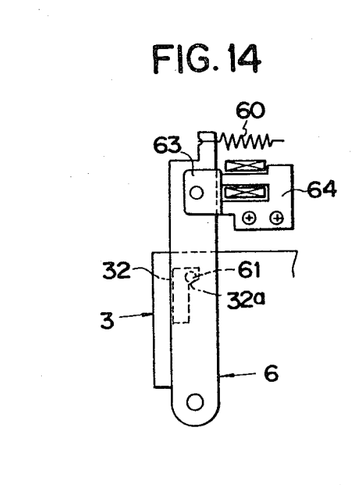
FIG. 14 shows a ground plan illustrating a modification of the locking mechanism of the locking member for locking the control plate.
Figure 15:
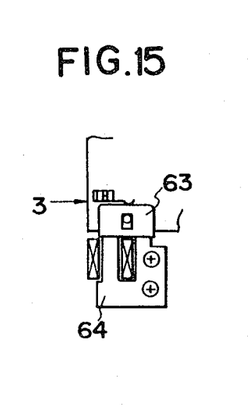
FIG. 15 shows a ground plan illustrating a further modification of FIG. 14 in which the locking member for locking the control plate is not used, either.

The control plate locking means 6 may be arranged to operate in such a structure as shown in FIGS. 14, 15, thus preventing members made of a rubber or plastic material such as the pinch rollers or the idler provided on the control plate 3 from being deformed. The pinch roller and the idler are required to be made of a rubber or plastic material with such a elasticity to secure their tape feeding and interlocking operations in an adequate frictional condition as well as to press them to corresponding members such as the capstan, etc. However, those members are apt to the deformed it they are kept pressed for a long time. Therefore, to avoid such deformation, it is necessary to release those members from the pressed condition while the tape player is at rest. However, in the above embodiment, deformation is inevitable because the forward and rearward movement of the head, the channel switching, etc. are carried out by the force generated by the motor, and thus, when the power source is cut off halfway of the reproduction, the pinch rollers, etc. are kept pressed and cannot be manually released.

The structures as shown in FIGS. 14, 15 are made to eliminate the above drawbacks. In FIG. 14, the control plate locking means 6 is provided with an attractive core 63 which is to be electromagnetically attracted by an electromagnetic plunger 64 fixed on the deck 10. In this case, the spring 60 is arranged to have such a small spring force not to allow the pin 61 to engage with the lock portion 32a in the locking bore 32 of the control plate 3. Thus, when the control plate 3 comes to advance, the core 63 of the locking means 6 is displaced by the spring force of the spring 60 to get in contact with the plunger 64 which is energized, thus being locked by the plunger 64. Therefore, when the plunger 64 is deenergized on carrying out eject, fast feeding or rewinding, the control plate 3 is made to return because the spring has not a force large enough to lock the control plate 3. That is, the control plate 3 is allowed to return by deenergizing the plunger 64, and in the same manner, which means that the control plate 3 can be also returned upon any external electric interruption. Then, the rubber or plastic members e.g. pinch rollers, idlers etc. and other interlocking members disposed on the control plate 3 are prevented from being left pressed to capstans and the like and being accordingly deformed.

Incidentally, the above structure as shown in FIG. 14 may be modified as shown in FIG. 15 in which the core 63 is mounted on the control plate 3 and the plunger 64 is disposed in a position corresponding to the advanced portion of the control plate 3. With this arrangement, almost the same operational relation as the former example can be obtained.

Figure 5:
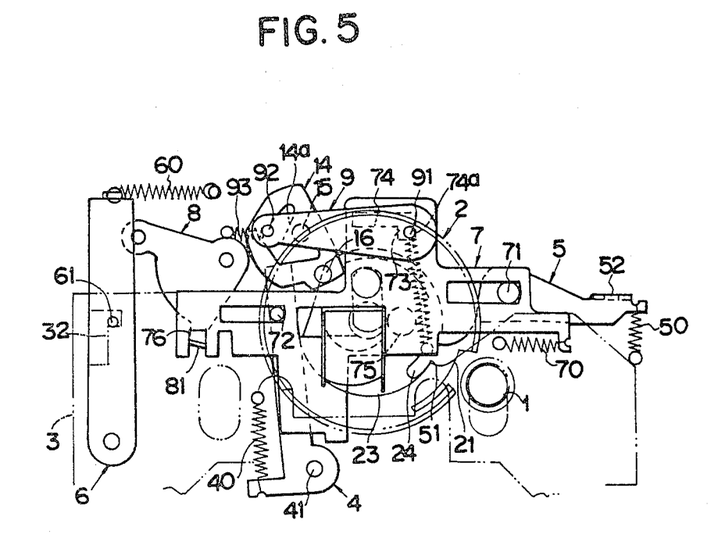
FIG. 5 shows a ground plan illustrating a condition that the operational plate is consequently returned to be thereby locked.

The operations of the embodiments will now be described. The locking plate 5 is constructed as shown in FIGS. 10–13, that is, the locking plate 5 is made to move as shown in FIG. 3 upon insertion of a tape pack, tape end detection or program switching operation, thus to be released from engagement with the projection 24 formed on the rotatable gear 2. Due to the disengagement, the preparatory plate 4 comes to apply a force to the rotatable gear 2 so as to rotate it to the anti-clockwise direction, thus causing the engagement of the rotatable gear 2 and the driving gear 1. If the rotatable gear 2 is rotated under the condition that the control plate 3 is on a retreated position as shown in FIGS. 1, 3, the cam portion 22 comes to act on the engaging element 75 of the operational plate 7 to allow it to move to right in the drawings. Reciprocal movement of the operational plate 7 causes the operational member 8 to pivot to the direction as shown in FIG. 5 by an arrow, thus making the control plate go ahead. Since the control plate 3 remains in the retreated position in the beginning of the operation of the operational plate 7 as described above, the pin 91 of the cam operational plate 9 does not fall in the curved portion 74a of the bore 74. That is, even when the spring force of the spring 90 is applied, the pin 91 slides only in the straight portion of the bore 74 thus allowing the control plate 3 only to go ahead, pressing the head 17 mounted on the control plate 3 to an inserted tape pack and pressing the pinch rollers 18a to the capstan, only.

Figure 6:
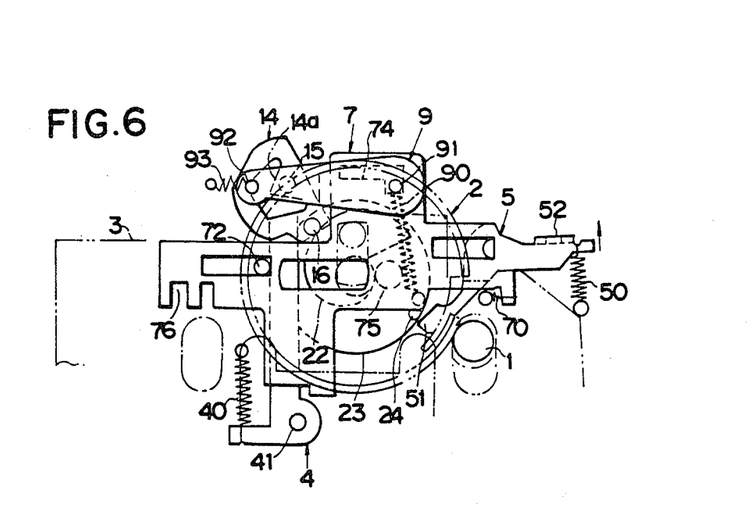
FIG. 6 shows a ground plan illustrating a condition that the operational plate is made to slide again by the rotatable gear while the control plate remains in its advanced position.

However, when the rotatable gear 2 is made to rotate under the condition that the control plate 3 goes ahead to thereby cause the pin 61 of the control plate locking means 6 to be locked at the locking portion of the locking bore 32, the pin 91 of the cam operational plate 9 as shown in FIG. 5 falls in the bore 74 of the operational plate 7 due to the action of the spring 91 to be thereby in engagement. In such condition, the locking plate 5 is made to move so as to release the engaging end 51 thereof from engagement with the projection 24. Accordingly the rotatable gear 2 is brought in engagement with the driving gear 1 as shown in FIG. 6 to thereby start rotating in the same manner as described above, thus causing the operational plate 7 to go ahead.

Figure 7:
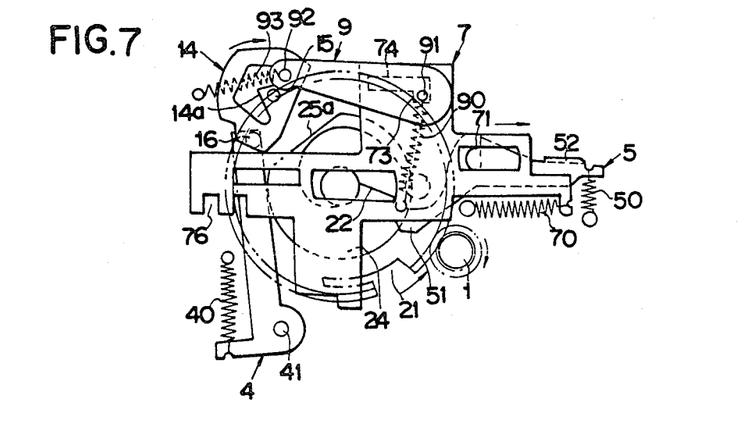
FIG. 7 shows a ground plan illustrating a condition that the inverting cam is switched due to the consequent return of the operational plate.
Figure 8:
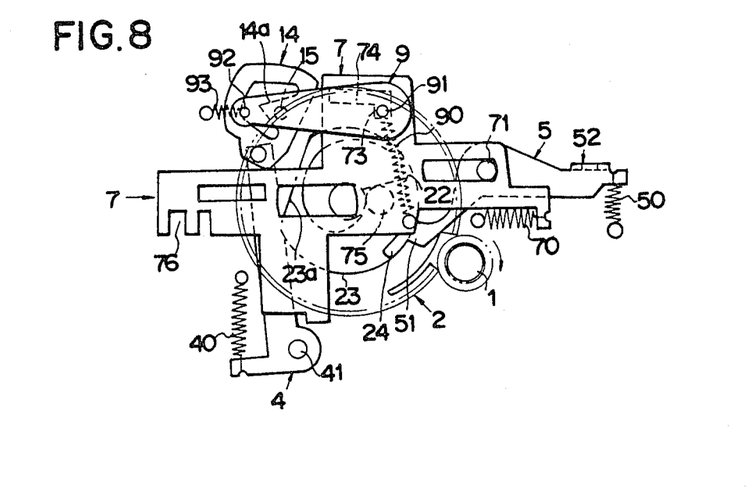
FIG. 8 shows a ground plan illustrating a condition that the operational plate is further made to slide from the condition of FIG. 7.
Figure 9:
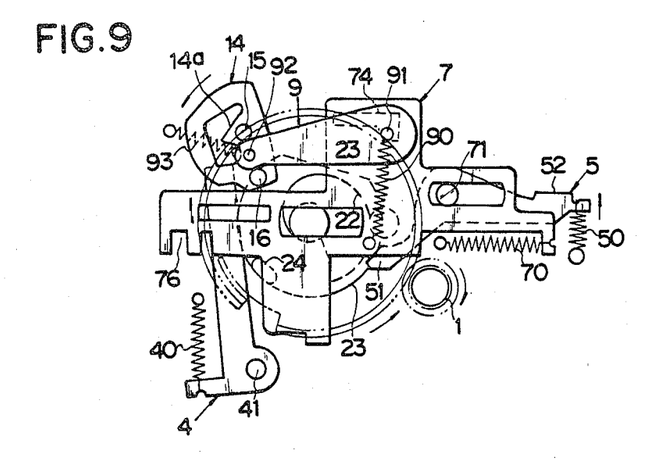
FIG. 9 shows a ground plan of the tape player illustrating a switched condition of the inverting cam due to the consequent return of the operational plate.

The pin 92 of the cam operational plate 9 acts on one of valleys at both sides of the tooth 14 a formed in a central portion of the switching cam 14 resistantly to the spring force of the spring 90 to operate the switching cam 14 as shown in FIG. 7. In this condition, the spring 70 provided on the operational plate 7 is sufficiently tensed to store the spring force. Then, when the driving gear 1 come to get in the recessed portion 21 of the rotatable gear 2 to be released from engagement with the rotatable gear 2 as shown in FIG. 8, the operational plate 7 is returned by the stored spring force of the spring 70. Therefore, under such a condition as shown in FIG. 7, the pin 92 disposed in a valley of the tooth 14a gets out thereof together with the cam operational plate 9 as shown in FIG. 8 (still keeping the switching cam 14 in a switching condition as shown in FIG. 7) to stop in an inactive condition with respect to the tooth 14a. When the locking plate 5 is actuated again in the condition of FIG. 8, the pin 92 falls in the other valley adjacent to the tooth 14a because the switching cam 14 has been switched to reversely rotate. That is, by reversely switching the switching cam as shown in FIG. 9 to return. It is the condition as shown in FIG. 6 and consequently disengaging the driving gear 1 and the rotatable gear 2 from each other, the operational plate 7 and the cam operational plate 9 are made to return by the stored spring force of the spring 70, thus the pin 92 being also released from the valley of the tooth 14a to return in the condition as shown in FIG. 5. When the above condition is obtained, the locking plate 5 is released from the projection 24, thus repeating the operation as described above referring to FIG. 6–8, and consequently, the operation as changed from FIG. 9 to FIG. 5. Therefore, the channel switching plate 13 can be switched by the reverse switching operation of the switching cam 14 to carry out the channel switching operation. Thus, a so-called auto-reverse operation can be attained.

In the above structure, it is possible to carry out operations of mechanisms relative to the reproduction such as a head, pinch rollers, etc. as well as channel switching operation by a common power source. Additionally, such operations can be effectively changed between the pin 91 of the cam operational plate 9 and the engaging step 31 of the control plate 3 as well as the bore 74 having a J-like configuration. Therefore, although the device is capable of carrying out respective objects with a relatively simple structure, it can be prevented from being misoperated.

When a motor for driving tape is used also for channel switching operation, it is possible as a matter of course to omit an attraction type electromagnetic plunger large in size which has conventionally been used for the channel switching. Accordingly, it is possible to solve the problems that the entire body of a tape player has had to be formed large and thick in size and heavy in weight as a result of using such a large electromagnetic plunger which consumes a lot of electricity. Further, by omitting such a large consumptive plunger, it is also possible to minimize capacities of various control parts and electric circuits for the plunger, thus allowing a tape player to have a simple structure and a compact size.

As a matter of course, even though automatically constructed, the above embodiment has advantages not only that there is no need of providing an independent power source for reproduction mechanisms like a head, a pinch roller, etc. but also that most of their operational means can be commonly used.

According to the present invention as described above, by utilizing a rotatable cam driven by a rotational power source means and an operational means interlocking with the rotatable cam as well as arranging a control means which causes forward and rearward movements of reproduction mechanisms such as a head, a pinch roller or an idler to interlock with the operational means, it is made possible to automatically carry out such movement of the reproduction mechanisms by means of a rotational power source means such as a motor and the like for driving a tape, without requiring any manual operation of manual operational means.

Further, due to separation of reproduction operations from manual operational means, operational means for eject, fast feeding and rewinding need not be interlocked with the reproduction mechanisms. Thus, the tape player can be made simple, compact and thin. At the same time, operational force for operating the tape player is largely reduced.

Further, according to the embodiments by arranging the above-described control means to be locked in its reproduction position by means of an electromagnetic plunger, the control means can be automatically released from its reproduction mode upon interruption of power source even though the reproduction mechanisms is an automatical one operated by the rotational power source. Then, the pinch roller, the idler, etc. are not left in pressed condition, and accordingly, it is possible to avoid deterioration of performance of the tape player which may be caused by the deformation, etc. At the same time, since an electromagnetic mechanism of a simple attraction type having a compact size and a low power may be used, the circuit for it can be simplified.

We claim:

1. A magnetic recording/reproducing apparatus which comprises:
   a motor
   a rotation transmitting means;
   a cam means;
   a first locking means normally engaged with said rotation transmitting means to lock the latter and disengageable therefrom to engage said motor with said cam means through said rotation transmitting means for transmitting rotating power of said motor to said cam means when said first locking means is released, thus to rotate said cam means;
   a magnetic tape playing means;
   a control means for shifting said magnetic tape playing means to a playing position in response to the rotation of said cam means; and
   a second locking means for locking said control means at the playing position.

2. The apparatus as claimed in claim 1, wherein said second locking means comprises a plunger, a locking member for locking said control means by means of said plunger and a power source for said plunger, said locking member being cancelled from its locking condition when the power source is off.

3. The apparatus as claimed in claim 1, including means for connecting said motor for driving a magnetic tape.

4. The apparatus as claimed in claim 1 further comprising an electromagnetic mechanism for operating said first locking means.

5. The apparatus as claimed in claim 1 in which said tape playing means includes a reel base, said apparatus further comprising a means for operating said first locking means in response to interruption of the rotation of said reel base of said magnetic tape playing means.

* * * * *